(12) United States Patent
Horak

(10) Patent No.: US 10,616,492 B2
(45) Date of Patent: Apr. 7, 2020

(54) METHOD FOR ACQUIRING IMAGES OF A SCENE, FROM A SENSOR ON BOARD A MOVING CARRIER, WITH SERVOCONTROL OF ITS LINE OF SIGHT

(71) Applicant: THALES, Courbevoie (FR)

(72) Inventor: Raphaël Horak, Elancourt (FR)

(73) Assignee: THALES, Courbevoie (FR)

( * ) Notice: Subject to any disclaimer, the term of this patent is extended or adjusted under 35 U.S.C. 154(b) by 0 days.

(21) Appl. No.: 15/774,251

(22) PCT Filed: Nov. 18, 2016

(86) PCT No.: PCT/EP2016/078146
§ 371 (c)(1),
(2) Date: May 7, 2018

(87) PCT Pub. No.: WO2017/085259
PCT Pub. Date: May 26, 2017

(65) Prior Publication Data
US 2018/0332232 A1    Nov. 15, 2018

(30) Foreign Application Priority Data

Nov. 20, 2015 (FR) .................................... 15 02431

(51) Int. Cl.
*H04N 7/18* (2006.01)
*H04N 5/232* (2006.01)
(Continued)

(52) U.S. Cl.
CPC ....... *H04N 5/23296* (2013.01); *G01C 11/025* (2013.01); *G01S 13/90* (2013.01); *G01S 17/90* (2020.01); *G01S 13/9052* (2019.05)

(58) Field of Classification Search
CPC ... H04N 5/23296; G01S 17/895; G01S 13/90; G01S 2013/9052; G01C 11/025
(Continued)

(56) References Cited

U.S. PATENT DOCUMENTS

| 5,481,479 A * | 1/1996 | Wight ............. G03B 37/02 |
| | | 348/144 |
| 2005/0177307 A1* | 8/2005 | Greenfeld ............. F41G 5/14 |
| | | 701/409 |

(Continued)

FOREIGN PATENT DOCUMENTS

| FR | 2 884 312 A1 | 10/2006 |
| FR | 2 944 110 A1 | 10/2010 |

(Continued)

*Primary Examiner* — Helen Shibru
(74) *Attorney, Agent, or Firm* — Baker & Hostetler LLP

(57) ABSTRACT

Images of a scene are acquired from a moving carrier that is equipped with a sensor. The angular direction of the line of sight of the sensor is automatically controlled. The acquisition is carried out: for a first position of the carrier, with automatic control allowing an outward scan, combined with a scan in step-and-stare mode with a biaxial stare micromovement, of a band of terrain of the scene to be carried out, a first strip of images thus being acquired, at least one other strip of images of the same zone of terrain being acquired by reiterating these scanning steps for at least one other position of the carrier, and each image of another strip being acquired with a preset degree of overlap with the images of the first strip.

18 Claims, 4 Drawing Sheets

(51) Int. Cl.
*G01C 11/02* (2006.01)
*G01S 13/90* (2006.01)
*G01S 17/90* (2020.01)

(58) Field of Classification Search
USPC .......................................... 348/144
See application file for complete search history.

(56) References Cited

U.S. PATENT DOCUMENTS

| | | | |
|---|---|---|---|
| 2008/0031528 A1* | 2/2008 | Crombez | G01C 11/06 382/232 |
| 2008/0221843 A1* | 9/2008 | Shenkar | G06T 17/05 703/1 |
| 2012/0249739 A1 | 10/2012 | Gostynski et al. | |
| 2012/0308084 A1* | 12/2012 | Perrier | G06T 7/20 382/107 |
| 2013/0142500 A1* | 6/2013 | Yavin | G01C 11/025 396/7 |
| 2014/0266869 A1 | 9/2014 | Liu et al. | |

FOREIGN PATENT DOCUMENTS

| | | |
|---|---|---|
| WO | 98/08193 A1 | 2/1998 |
| WO | 2014/122625 A1 | 8/2014 |

* cited by examiner

METHOD FOR ACQUIRING IMAGES OF A SCENE, FROM A SENSOR ON BOARD A MOVING CARRIER, WITH SERVOCONTROL OF ITS LINE OF SIGHT

CROSS-REFERENCE TO RELATED APPLICATIONS

This application claims priority to foreign French patent application No. FR 1502431, filed on Nov. 20, 2015, the disclosure of which is incorporated by reference in its entirety.

TECHNICAL FIELD

The field of the invention is that of image acquisition with automatic control, via image processing, of the line of sight of a sensor, for example for the reconnaissance or surveillance applications.

BACKGROUND

The line-of-sight (LOS) scanning patterns of the automatically controlled radars or optical sensors implemented in pods, aircraft or ground vehicles are conventionally patterns of the following types:
  sideways scan at constant angle, also called strip-map mode in the radar field;
  spotlight on a fixed point (=used to track a fixed point);
  tracking of a moving target;
  circular scan, for ground applications.

The first type of scan allows a band of terrain to be scanned, but with a constant view point between the aircraft and the point on the ground that is scanned.

The second allows an object on the ground to be seen from various view points but covers a very limited zone of the ground.

The third is a variant of the second, and does not guarantee a multiplicity of view points.

The fourth is similar to the first and has a constant azimuth angle.

These four classes of scan do not allow, with a good angular resolution, a large extent of ground to be viewed from various viewpoints.

SUMMARY

The aim of the invention is to mitigate these drawbacks.

The solution provided consists in applying a specific automatic-control mode to the line of sight of the sensor in order to achieve a plurality of outward scans of the ground, each outward scan generally being followed by a rapid return scan of the ground, with which scans step-and-stare micro-movements are combined, these micro-movements allowing images that are sufficiently stable and exposed despite the rapid movements of the scans to be obtained. Image processing allows the precision of this automatic control to be increased.

More precisely, one subject of the invention is a method for acquiring images of a preset ground scene, from a carrier that is moving along a path, and that is equipped with an optical sensor having a line of sight, which comprises a step in which the sensor acquires successive images of the scene during the movement of the carrier, and a step in which the angular direction of the line of sight is automatically controlled by a processing unit that is connected to the sensor, the acquisition being carried out:
  for a first position of the carrier on its path, with automatic control of the angular direction of the line of sight allowing what is called an outward scan, combined with a scan in step-and-stare mode, of a preset band of terrain of the scene to be carried out,
  a first strip of images thus being acquired;
  and in that at least one other strip of images of the same zone of terrain as the first strip is acquired by reiterating these scanning steps for at least one other position of the carrier on its path, each image of another strip of a terrain-band segment being acquired, for the same terrain-band segment, with a degree of overlap with the one or more images of the first strip that is higher than a preset high degree of overlap, the overlapping images of one strip to the next, i.e. images of the same terrain segment, being thus acquired in these iterations in various directions of the line of sight, respectively;

It is mainly characterized in that the step-and-stare mode, which includes steps, i.e. translational micro-movements, having an amplitude controlled by the processing unit, comprises:
  at least one step, called a sideways step, having a main component that is perpendicular to the outward scan, combined with
  at least one step, called a longitudinal step, having a main component that is parallel to the outward scan, and
  a biaxial stare micro-movement in order to compensate for a translational movement of the line of sight during the acquisition of each image,
    and in that the automatic control of the angular direction of the line of sight is achieved by carrying out image processing on the acquired images.

This solution, with suitable scanning movements of the line of sight, allows both a large zone, optionally taking the form of various contiguous or non-contiguous bands of terrain, to be covered and all of these scanned points to be viewed from different angles. It in particular allows strips of images covering a large area of the ground to be provided at different times and from different viewpoint angles.

It achieves, by virtue of a specific bidirectional step-and-stare movement that is synchronous with the principal automatic control of the line of sight, a dwell time that is sufficiently long for each image, and thus makes it possible to guarantee that the images are of sufficient quality.

The solution thus allows, after image processing of the strips (these strips containing points on the ground seen with various sighting angles), strips of images that are geometrically of the same format to be constructed, i.e. strips of images that are superposable to form an ortho-photograph or a geographic map, other methods not allowing this to be done when the movement of the carrier with respect to the relief of the zone is great.

The proposed solution uses the following new concepts:
  Repeated frontways scan and counter-scan of the line of sight, followed by acquisitions, of one or more bands of ground, the carrier equipped with the sensor being in movement, so as to view, a number of times (typically between 5 and 20 times), a given point on the ground with different viewpoints, and to do so for all the points of a band of terrain of large longitudinal extent (or, where appropriate, for all the points of various bands of terrain scanned in parallel);
  Bi-axial step-and-stare combining, in addition to continuous conventional step-and-stare micro-movements, sideways steps (and stares) that may be large in amplitude, all this combined with image processing in order to correctly assemble the images of each strip. Whereas in the prior art the micro-movement is mono-axial, another particularity of this step-and-stare is that it introduces a bi-axial stare micro-movement in order to remove haze and improve the quality of the image during the integration time thereof. It also makes it possible to add a rotary component to the image during the stare, thus ensuring the images in the generated strip of images may be assembled as perfectly as possible.

Simultaneous production of various strips of images, each strip of which corresponds to a band of terrain having a shape that is controllable both in terms of width and length.

Production, for a given band of terrain chosen in the scene of various superposed strips at various regular times and taken from different viewpoints.

Possibility of generalizing the bands to scenes that are not limited in the length direction (bands that scroll with the advance of the carrier).

The method may be carried out in real-time as the carrier advances without placing constraints on the path thereof: the automatic control compensates for the movements of the carrier during the scan of the bands of ground.

The first position and the other successive positions of the carrier serving as base for the scanning may either be unique during the scan, or multiple and decomposed into as many positions as there are images during the scan when the carrier is moving during the scan.

For a given terrain-band segment, each image of another strip is advantageously acquired, for the same terrain-band segment, with a precision of alignment with the one or more images of the first strip that is higher than a preset precision of alignment.

The automatic control of the angular direction of the line of sight is advantageously achieved by carrying out image processing on the acquired images so that, within a given strip, adjacent images are aligned with an alignment quality higher than a predefined quality.

The automatic control of the angular direction of the line of sight is advantageously achieved by carrying out image processing on the acquired images so that, within a given strip, adjacent images have a degree of overlap higher than a preset low degree of overlap, so as to obtain a continuous strip.

The automatic control of the angular direction of the line of sight is preferably achieved by carrying out image processing on the acquired images so that the images of a given scene segment originating from two strips are aligned with an alignment quality higher than a predefined quality.

The biaxial stare micro-movement may furthermore be associated with a counter-rotary movement of the line of sight, which movement is determined by the processing unit in order to compensate for a rotational movement of the line of sight during the image acquisition, or in order to align the images with one another as best as possible.

According to one feature of the invention, at least one other preset band of terrain is associated with the scene and is scanned by the scan carried out from said positions of the carrier, and the step-and-stare mode furthermore comprises at least one terrain-band-changing lateral movement in order to pass from one terrain band to another terrain band.

This terrain-band-changing lateral movement may be combined with a band-changing frontways movement.

The outward scan is generally carried out in the direction of the path.

Generally, what is called a counter-scan or return scan, which is the inverse of the outward scan, is carried out following the outward scan and before the reiteration.

This counter-scan may be direct or itself be combined with a scan in step-and-stare mode. Specifically, images are optionally acquired during the counter-scan, which is combined with a scan in step-and-stare mode with steps, i.e. translational micro-movements, that have an amplitude that is controlled by the processing unit so that the successively acquired images partially overlap, which scan comprises:

1. at least one step, called a sideways step, perpendicular to the counter-scan, in order to scan the zone sideways, combined with
2. at least one step, called a longitudinal step, parallel to the counter-scan, in order to scan the zone longitudinally, and
3. a biaxial stare micro-movement in order to compensate for a translational movement of the line of sight during the acquisition of each image.

A method is obtained that allows:

the line of sight of the sensor of a moving carrier to be automatically controlled so that the latter scans a large ground scene while guaranteeing that each point on the ground is seen a plurality of times from different viewpoint angles covering the widest possible range of angles;

one or more strips of contiguous (or adjacent) and partially overlapping images corresponding to a scene that is freely chosen by the operator to be simultaneously reproduced;

any point contained in these strips to be recreated, as a function of time, from various viewpoints covering a wide angular range, making it possible, for example, to obtain, by processing, 3-D reconstructions of the objects contained in these strips; and the images used to form the strips to be corrected, in terms of conformity, using the 3-D information resulting from the multiplicity of viewpoints, which extend over a quite extensive angular range.

It furthermore respects automatic-control constraints associated with the sensor: speed of rotation and acceleration of the line of sight.

Mention may be made of other advantages of the method, such as:

it allows the operator to see, in real-time, from various viewpoints, objects of the scene, which he selects himself;

it makes it possible to create a 3-D map of all of the strips;

it makes possible modes in which the strips continuously scroll (i.e. are not limited spatially in the direction of movement of the carrier);

it allows strips to be spliced into a larger strip at any point on the path (notion of real-time-programmable surveillance zone); and it allows the path of the carrier and the roll, pitch and yaw movements of the carrier to be freely chosen within the limits of the system (the line of sight must continue to be able to scan the strips).

BRIEF DESCRIPTION OF THE DRAWINGS

Other features and advantages of the invention will become apparent on reading the following detailed description, which is given by way of nonlimiting example and with reference to the appended drawings, in which:

FIGS. 1a-1c schematically illustrate top views of an example of acquisition of images from an on-board sensor integrated into an aircraft and for: (FIG. 1a) a scene with 3 separate bands of terrain that are not closed on themselves; and (FIG. 1b) a scene with 3 bands of terrain 2 of which are closed on themselves; FIG. 1c illustrating, in greater detail, consecutive scans carried out in parallel on two separate bands of terrain;

From one figure to the next, elements that are the same have been referenced with the same references.

DETAILED DESCRIPTION

To describe the invention, the scene that it is desired to acquire images of will be considered to be preset and divided into a plurality of bands of terrain that are optionally but not necessarily separate and optionally but not necessarily parallel. The term "band" is understood to mean a zone of terrain the average longitudinal dimension of which is larger than its average lateral dimension. These bands correspond to the terrestrial space under the carrier, which space may contain infrastructure, but may generally be any other type of surface of the scene visible from the carrier, for example the facades of buildings seen from a ground vehicle.

Since the scene to be scanned may be of any shape, the corresponding bands may also be of any shape, and of any number and of any orientation. The shape/width of the scanned band may for example have an ellipse or S shape, the width of the band may also increase or on in contrast decrease during the scan. More complex shapes may be imagined such as a Y shape (road junction), a star shape (crossroad and its roads), a shape containing holes or any shape decomposable into elementary bands. The orientation of the band on the ground is freely chosen.

Examples of scannable bands of terrain will be described with reference to FIGS. 1a-1c.

Figure 1A:
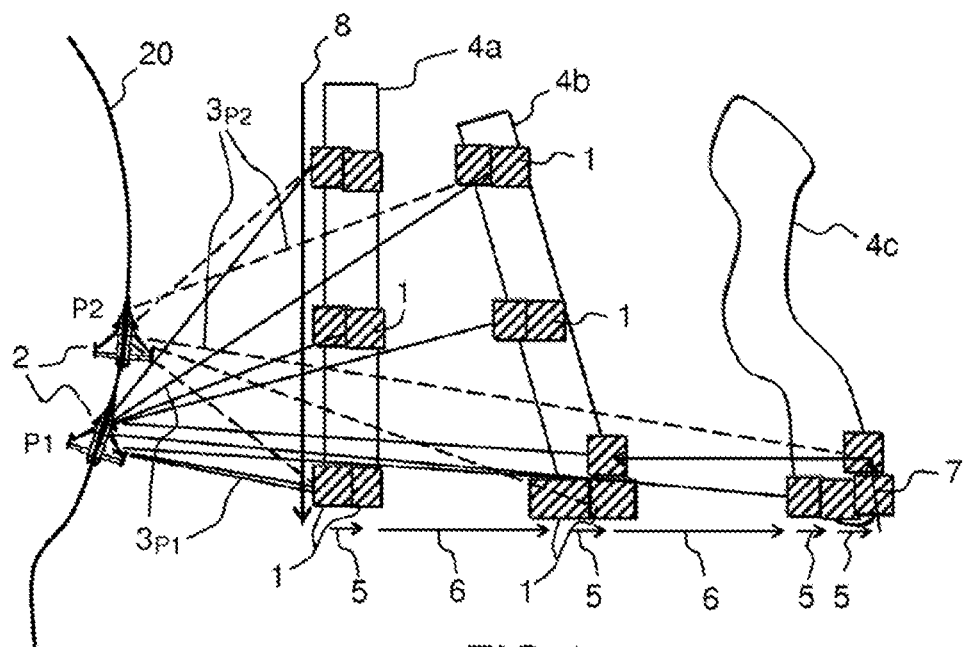

FIG. 1a illustrates a first initial scan of three bands of terrain 4a, 4b and 4c from a first position P1 of the carrier 2 (which itself is moving during this first scan), the lines of sight being indicated by the solid lines, and a second scan of the three bands from a second different position P2 of the carrier, the lines of sight being indicated by the dashed lines. It will be understood that a number of particular cases may arise:

The case where the initial scan is strictly carried out from the same position, a second scan (and optionally other scans) being carried out from one or more single points that are different from the first/preceding point (this would be the case for a moving carrier that changes its position at different points in time, such as a helicopter mixing stationary positions serving to scan the terrain and movements from one point to another to change viewpoint).

The case where the initial and following scans are carried out during a continual movement of the carrier (the points (P1) corresponding to each image of the scan are then various successive points that are closeby one another). The proximity of these points depends on the scanning speed, which is assumed to be sufficiently high that a second scan (or even other scans) can be carried out before starting another scan at a point (Pi) that is sufficiently far from the preceding point, but not so far as to prevent the various (at least two) scans from being carried out before the bands of terrain scanned by the line of sight of the sensor exit from the visual field of the scanning sensor.

The third particular case is the case mixing the 2 preceding modes: i.e. the case of a carrier that scans the scene with its sensor throughout its movement over a segment of its path, and that carries out scans for various different stationary spatial positions on the rest of the path (if the carrier allows it).

The scan according to the invention covers these various cases, provided that, in every case, the next scan starts at a different point (P1), (P2), (Pi). It is possible for i=3 but typically there are 5 to 20, or even more, different carrier positions. FIGS. 1a-1c and 2a-2b show only case 1 or case 2 with a very rapid scanning movement (the lines of sight each originate from points (P1) that are almost coincident). Case 2 with a slightly slower scanning movement (but nonetheless still quite fast so that at the end of the scan, the carrier does not have to wait to reach the following position at which the next scan starts) is not shown in the figures.

In all of these particular cases, an image corresponds to a zone of terrain (it is the footprint of the projected image, on the terrain, along the line of sight, and the field of the sensor) and to a single point on the path of the carrier. It is also possible to say that one point of the terrain scanned 2 times or more, is scanned from points (Pi) on the path that are necessarily different.

The various scans are carried out so that most of the images 1 obtained in the first scan of the bands of terrain are overlapped by images obtained in the second scan (or the following scans if they exist).

Figure 1B:
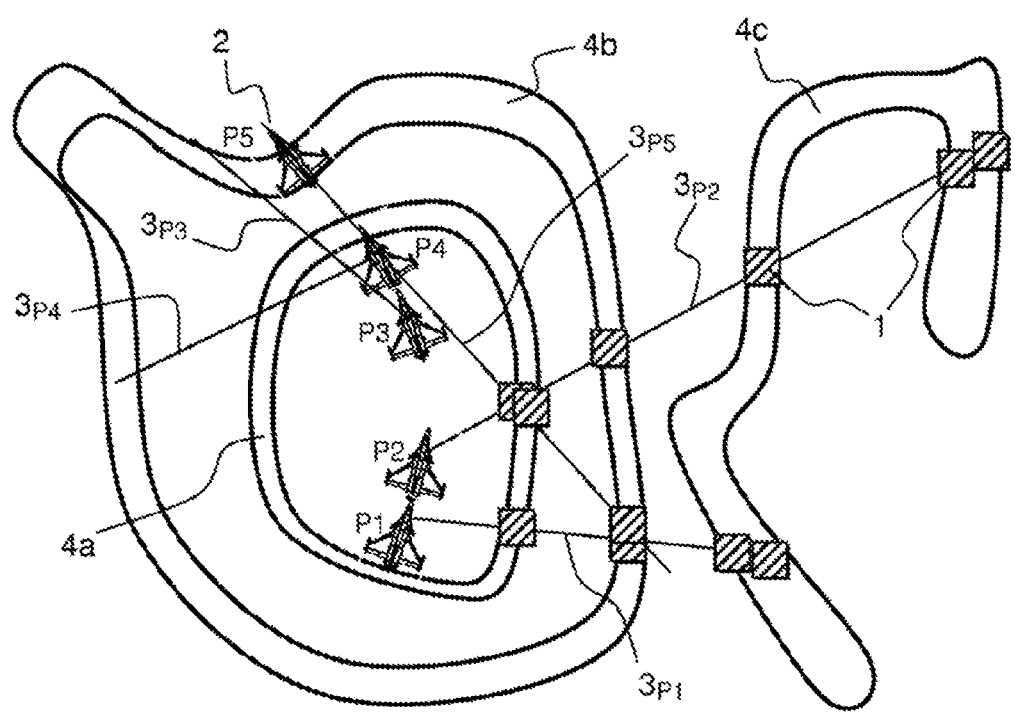

FIG. 1b illustrates various directions of the line of sight during a first scan of two bands of terrain 4a and 4b that are closed on themselves and that encircle, in the present case, the carrier 2, and of a third band of terrain 4c. A single direction of the line of sight $3_{P1}, \ldots, 3_{P5}$, is indicated for each of the 5 positions P1, . . . , P5 of the carrier that are shown in the figure. From the 5th direction $3_{P5}$, images are acquired that superpose on certain images acquired from the position P1 of the carrier. The present case is a theoretical case that corresponds to a very rapid movement of the carrier and a slower movement of the line of sight, because it was desired not to clutter the figure. In fact, the 5 directions of the line of sight may be interpreted as an example of lines of sight corresponding to 5 complete scans of the line of sight for 5 positions of the carrier.

The forward scanning direction is generally dependent on the direction of the path of the carrier, however, for a band that is closed on itself (such as shown in FIG. 1b with the bands 4a and 4b) or for a band that is highly inclined with respect to the path of the carrier (see band 4c of FIG. 1b), the "forward" scanning direction is determined by the processing unit so as to minimize the distance the line of sight has to travel during the movement of the carrier and, in fine, to increase the number of outward-return trips over each band.

According to the invention described with reference to FIGS. 1a-1c and 2a-2b, the images 1 are acquired by an on-board sensor that is integrated into a carrier 2 that is moving along a path 20.

Let acquisition of a first strip of images, also called the initial strip, first be considered. This strip is acquired for a first position P1 of the carrier 2 on its path, automatic control of the line of sight 3 allowing the following to be carried out:
a scan of a preset first band of terrain 4 of the scene starting with the line of sight in an initial position on the ground, which scan is called the outward scan and is combined with a scan in step-and-stare mode with steps, i.e. translational micro-movements, which comprises:

at least one step, called a sideways step 5, perpendicular to the outward scan, in order to scan the band of terrain 4 sideways (or somewhat sideways), which is combined with at least one step 7, called a longitudinal step, parallel to the outward scan, in order to scan the band of terrain longitudinally (or somewhat longitudinally), and a biaxial stare micro-movement in order to compensate for a translational movement of the line of sight during the acquisition of each image 1.

The combination of these step micro-movements, their length and the number thereof before each stare micro-movement are for example chosen by the processing unit in order to optimize the scan time of the overall scan and/or the acquisition time of images in the various zones of the band of terrain. Certain longer steps between each stare also allow images not to be acquired of certain segments of the band of terrain.

A first strip of images of a first band of terrain is thus acquired. More generally, if at least one other band of terrain is considered, the 2 (or more) bands of terrain are simultaneously scanned in parallel by virtue of additional frontways or sideways step movements that make it possible to pass from one band to the next during the scan, producing a set of initial strips of images covering these various bands of terrain. Preferably, in order to make this strip of images continuous, adjacent images partially overlap one another. A small overlap of adjacent images is enough; this degree of overlap is higher than a preset low degree of overlap, typically 20% or even 10%. Most of the time, a minimum degree of overlap is employed in order to maximize the number of strips stored in the processing unit.

Once this initial strip (which is optionally completed with other initial strips if there are a plurality of preset bands of terrain) has been acquired, other strips of images are acquired for the same band of terrain (the same bands of terrain in the general case), by reiterating these scanning steps for one (and preferably a plurality of) other position(s) P2 of the carrier on its path 20. For a given terrain-band segment, each image of another strip is acquired, for the same terrain-band segment, with a high degree of overlap with the one or more images of the initial strip. Thus, the overlapping images of one strip to the next, which images are of the same terrain segment, are respectively acquired, in these iterations, with different line-of-sight directions because the position of the carrier has changed.

Figure 2A:
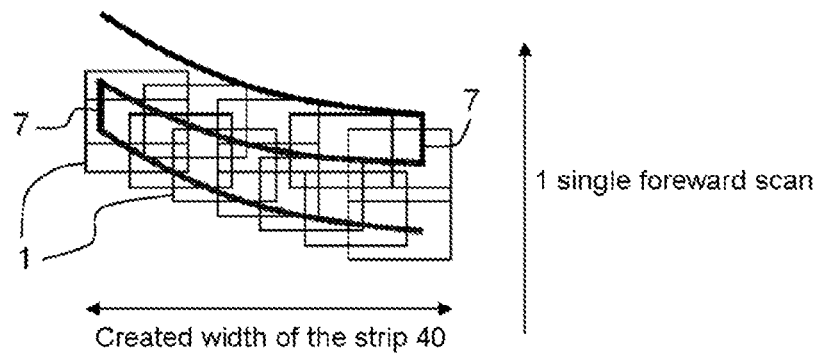
FIGS. 2a-2b schematically illustrate top views of an example of acquisition of images in a step-and-stare mode according to the prior art (FIG. 2a) and according to the invention (FIG. 2b)
Figure 2B:
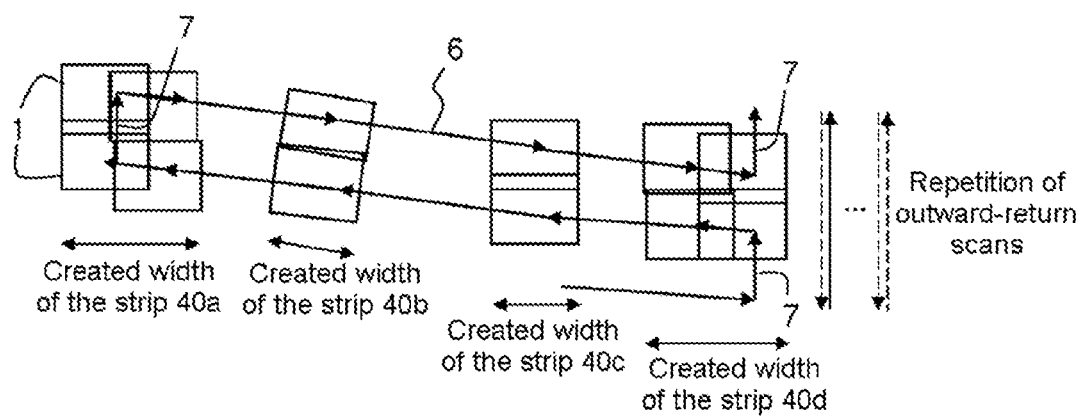

Generally, at least one other preset band of terrain is associated with the scene. In FIGS. 1a and 1b, three separate bands of terrain 4a, 4b and 4c may be seen. The step-and-stare mode then furthermore comprises at least one terrain-band-changing sideways movement 6 in order to pass from one band of terrain to another band of terrain. The strips of images corresponding to the separate bands of terrain may be acquired in parallel. In FIG. 2b, 4 strips of images are shown: 40a, 40b, 40c, 40d.

These steps will now be detailed. The line of sight 3 of the sensor is automatically controlled so as:

1) to make it scan forwardwise these preset bands of terrain 4. This forward scan of the line of sight (which may travel over the ground at a speed that may reach or even exceed 1500 m/s in the case of an on-board sensor integrated into an aircraft) is furthermore combined with a succession of local bidirectional step-and-stare micro-movements. Specifically, because of the very high speed of the forward scan of the line of sight (and of the very high speed with which the line of sight moves over the ground), it is necessary to introduce, into the general movement of the forward scan, step-and-stare micro-scans: stare micro-scans in order to ensure the image is captured with a sufficient image stability and a sufficient integration time and step micro-scans in order to pass from one image to the next. It is a question of making, in the step scans, very rapid jumps 5 or 7 between each image acquisition (=to pass from one image of a given band 4 to the next) or larger sideways jumps 6 (in order to pass from one band to the next), then of carrying out a stare scan consisting in applying, during the image capture, a micro-scan that compensates for the movement of the line of sight, in order to allow images to be captured, each with a long integration time during which the captured view of the band of terrain is stabilized.

From one image to the following image, these translational micro-movements 5, 6, 7 are not all identical; they are controlled by the automatic-control unit. The latter must check to ensure a controlled partial overlap is achieved between successive images of a given band, but also between adjacent images (of a given band) that are separated timewise by a sideways scan applied to pass from the first band to the other bands of terrain and then to return to the first band. These checks consist in measuring, via inertial means, which may or may not be combined with image processing, the degree of overlap between the adjacent images of a given band and in checking that a minimum overlap (meeting a criterion established beforehand by the system) exists therebetween.

Generally, the step micro-movements are decomposed into a component 5 or 6 perpendicular to the direction of the forward scan (5 is a step of small amplitude corresponding to the passage from one image of a band to the following, 6 is a step of larger amplitude corresponding to the passage from one band to another), and into a component 7 parallel to the direction of the forward scan. The steps the principal component of which is parallel to the direction of the forward scan are called frontways steps, and the steps the principal component of which is perpendicular to the direction of the forward scan are called sideways steps. These steps may be configured so as to achieve various scanning patterns. When a single band is to be scanned, it is for example possible to carry out: a yaw-ways scan, with a succession of exclusively sideways steps 5 (of sideways principal components), in order to scan the strip 40 sideways as shown in FIG. 2a; followed by an exclusively frontways step 7 (of frontways principal component) in order to achieve a frontways advance of the band; then a succession of exclusively sideways steps in the opposite direction to the preceding sideways steps in order to scan the band sideways in the other direction, etc. Provision may of course be made for less simple scanning patterns using the same elementary steps but combined differently.

The stare micro-movements for compensating for the movement of the LOS during the image capture are also bidirectional translational movements; they are not shown in the figures. In order to increase the precision of all of the images, a counter-rotary micro-scan is advantageously applied rotationwise around the line of sight between each step movement and each image capture during the stare. In addition to increasing overall precision, this allows a longer integration time (or illumination time in the case of a LIDAR) to be achieved.

these step micro-movements are accompanied by additional controlled sideways movements 6 of the line of sight, in order to pass from one band to another, these movements possibly being small if the two bands are closeby, or large if they are far apart. Likewise, the movements for passing from one band to another may be decomposed into sideways components and frontways components; however, these additional movements 6 have a sideways component that is generally larger than their frontways component, unless the two bands of terrain are offset along the frontways axis. FIG. 2b shows four strips 40 (strip 40a, strip 40b, strip 40c, strip 40d) corresponding to four bands of terrain 4a, 4b, 4c and 4d (which are not shown in this figure), respectively. If the scene includes only a single band, these movements 6 for passing from one band to another do not exist.

Figure 1C:
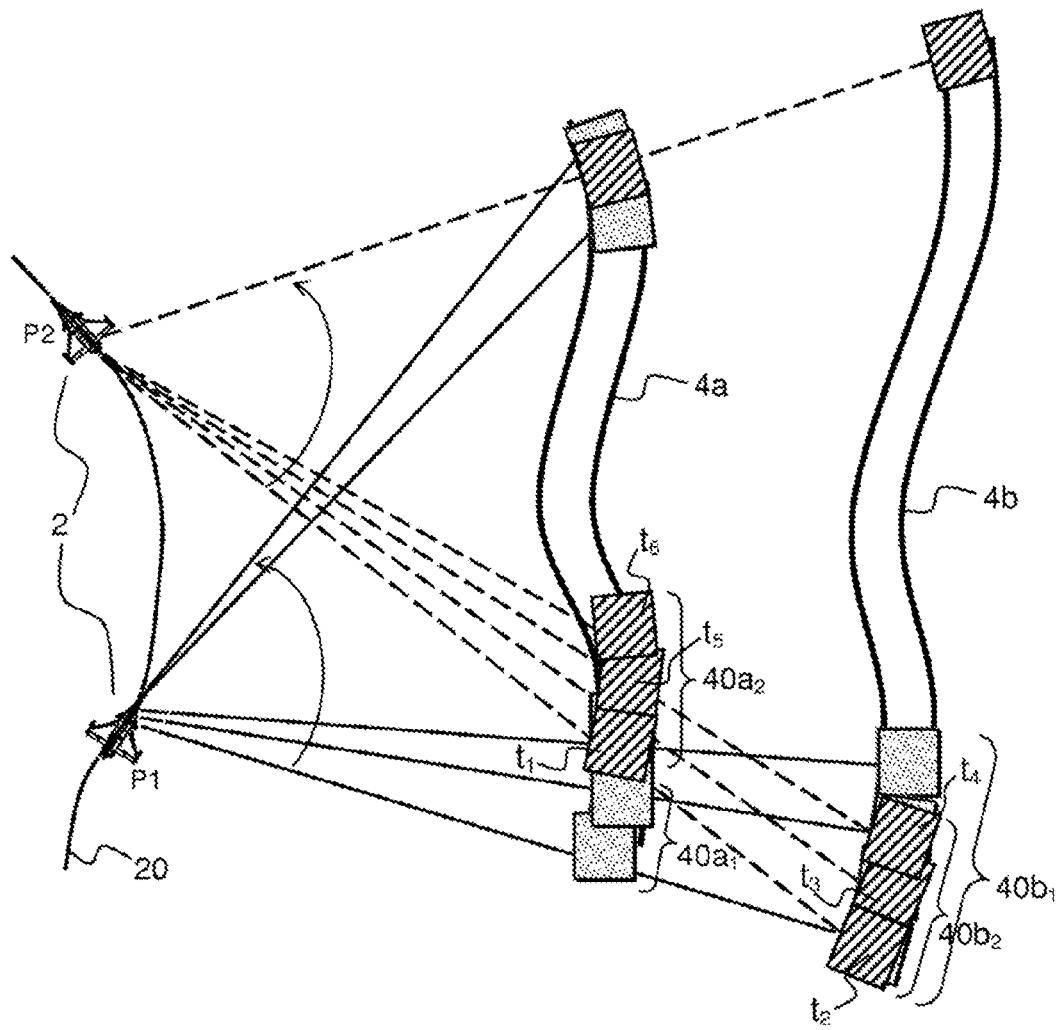

FIG. 1c illustrates a scanning strategy in which sideways (azimuthal) jumps are preferably carried out (so as to first scan all the bands in parallel so to speak) then frontways jumps to the bands furthest from the carrier before closer bands are returned to, this being done in order to minimize yaw-ways jumps, which may take longer than azimuthal jumps. In this way, the separate bands of terrain are scanned almost in parallel. More precisely, FIG. 1c illustrates, in more detail, 2 consecutive scans respectively carried out, from two positions P1 and P2, on two closeby bands of terrain 4a and 4b; the timewise order of acquisition of the images during the scan of the 2 bands are indicated for the images referenced 1: t1, t2, . . . , t6. Once, for a given band of terrain, a first strip of images (initial strip) has been generated from a given position (position P1 in the figure, the two initial strips being the strip 40a1 for the band 4a and the strip 40b1 for the band 4b, i.e. the strips of dotted images), one (or more than one) other strip(s) of images of the same band of terrain are generated in subsequent iterations, each other strip being obtained from another position of the carrier 2 (position P2 in the figure, these two other strips being the strip 40a2 for the band 4a and the strip 40b2 for the band 4b, i.e. the strips of striped images). This allows images of a given point on the ground to be acquired a plurality of times from different viewpoints and this to be done for all the points of a given band of terrain of large extent. The iterations determine the number of times that each band of terrain is scanned.

For each other strip, the processing that allows the line of sight of the scans to be automatically controlled onto the same band of terrain must also ensure that the current image (=image in the process of being acquired) projected onto the ground has a high degree of overlap with the corresponding image of the strip generated first. In other words, for a given terrain-band segment, each image of another strip is acquired, for the same terrain-band segment, with a degree of overlap with the one or more images of the first strip. This degree of overlap is higher than a preset high degree of overlap, for example 80%. Thus, the overlapping (depending on this degree) images of one strip to the next, i.e. the images of the same terrain segment, are respectively acquired in these iterations with line-of-sight directions that are different (considered in the 3-D coordinate system of the scene) i.e. at different viewing angles. Specifically, for a degree of overlap set for example to 80%, at least 80% of the points of the initial band of terrain are "re-seen" in the image acquisitions of each iteration; in other words, at least 80% of the points in the strip of images initially acquired also feature in each strip acquired in the iterations, respectively. Thus, for example, in FIG. 1a, points of the scene at the bottom left of the band 4a are present in two images 1: one captured when the carrier 2 is in a first position P1 on its path 20, the other captured when the carrier is in another position P2. The same principle is also illustrated in FIG. 1c, except that this time the numbers indicate an example of successive positions of the footprint, on the ground, of the images acquired by the carrier in position 2 during the scan of the 2 initial bands, these successive footprints corresponding to successive acquisition times t1, t2, . . . , t6 of these images. It will be noted that the images acquired in the second scan may very well not correspond to the images acquired in the first scan but overlap therewith, provided that a maximum overlap of all of the images of the 2 initial bands is guaranteed. A rotation of the line of sight of the sensor may however also be applied to ensure a perfect alignment of the produced images. This rotation, if it is carried out, is achieved by automatic control that itself may be achieved by image processing. The processing of the acquired images allows extensive strips of images to be generated, which strips are seen from various angles of incidence, and each strip of images may be regenerated, over time, in order that each point of the scene imaged in this strip can be seen, as a function of time, from various directions. For example, the reiterations continue until the scanned scene can no longer be scanned by the line of sight (sensor out of range or line-of-sight angle exceeding an acceptable threshold).

It will be noted that a conventional step-and-stare, which is illustrated in FIG. 2a, is known and applied to rapidly and continuously scan the ground sideways (with small frontways jumps): thus it generates an extensive longitudinal strip of images, but the strip is generated a single time by these conventional means and is necessarily seen from a single viewpoint (this scanning mode is called strip-map mode). It therefore differs from the scanning according to the invention (which, for a given zone of terrain, generates a plurality of strips that are seen from different viewpoints) and excludes the possibility of covering a plurality of bands of terrain. Another known mode is the spot-light mode, which consists in automatically controlling the line of sight to focus on a given location on the ground. It exploits, where appropriate, image processing to automatically control and stabilize the line of sight on a given location on the ground (the image processing correlates the various successive images of the sensor in order to allow a fixed point on the ground to be focused on). This mode results in a succession of images the footprint of which, on the ground, does not exceed the size of each image projected onto the ground. The intersection of the projected images then defines the zone of terrain which is seen from various angles in the various successive images. Once again, this mode differs greatly from the scanning according to invention since the recreated zone of terrain is very localized (restricted to the intersection of the projections of the images onto the ground) and does not correspond to an extensive band of terrain as in the application that we propose. According to invention, one or more strips of images of one or more bands of terrain of large longitudinal extent are generated, which strips are reiterated at least two times, typically between 5 and 20 times or more, by scanning the one or more bands of terrain with successive scans, as shown in FIG. 2b, this allowing each point of the scene present in the successive strips to be seen, over time, from various sensor line-of-sight angular directions. The differences in the angular directions of the various line-of-sight angles of the sensor to a given terrain-zone segment are typically limited to a maximum angle of 30° so as to make it possible to more easily use matching image processing with a view to extracting features therefrom or to carrying out 3-D reconstruction. Depending on the extent of the terrain to be acquired, the processing unit favors a minimum number of different viewpoints (typically between 5 to 20 different views of an acquired image segment).

For each other strip, the processing that allows the line of sight of the scans to be automatically controlled onto the same band of terrain must also ensure that, within each other strip, overlapping adjacent images overlap preferably with a preset minimum low degree of overlap, so that each other strip of images is also a continuous strip, as already indicated for the initial strip.

The line-of-sight processing guarantees that the images of any given segment of a band of terrain that are captured at different times with different lines of sight all overlap with a high degree of overlap (80% in our example). It is thus possible to extract therefrom a common zone of terrain containing all the images and that is sufficiently large and exploitable to obtain, over a large extent of terrain that corresponds to the intersection of the reconstructed longitudinal strips (which may or may not be closed on themselves, see FIG. 1a or 1b), an arbitrary zone in which images may be viewed with the different viewpoints of the carrier viewing this zone. For a given zone of terrain covered by the various reconstructed strips, it is very easy, since the geographic coordinates of the chosen zone are known, to extract, from the various strips, the corresponding images in which the zone can be seen, from the various points of view of the carrier having scanned this zone. Thus, a given point of terrain is seen a plurality of times from different points of view and at different times.

The processing that is applied to automatically control the movements of the line of sight may be carried out according to various embodiments.

According to a first embodiment, based on the use of inertial means, this processing consists in:

projecting the images onto the ground using the inertial means and in calculating the overlaps between two adjacent images projected onto the ground when these images form part of the same strip of images (the technique used for example calculates the projection onto the ground of the current image and of the adjacent image in order to measure the geometric transformation that exists between these two projected images and to measure their degree of overlap and their actual alignment);

doing the same thing between the image currently being acquired in the current strip of images (assuming that the current strip is the result of a scan of the line of sight that is different from the initial scan) and the image (or images) of the initial strip of images resulting from the first scan of the same zone of terrain as the zone of the current image;

checking that the overlap is lower than the set point (=preset degree of overlap) set for the low degree of overlap between two images of a given strip (lower than 10% for example) and that it is higher than the set point for the high degree of overlap that must exist between the images of another strip and the images of the initial strip (higher than 80% for example);

checking the same thing for the desired alignment between images;

if the overlap is lower than the targeted set point, slowing the relative movement of the line of sight and accelerating it in the contrary case (or vice versa depending on whether the overlap is on the left in the direction of the movement or on the right, or depending on whether it is a question of the overlap between images of a given zone of terrain captured at different times and in a different scan, or of the overlap of adjacent images in the interior of a given strip captured during the same scan); and doing the same thing for the alignment of the images and correcting it if necessary via rotary movement of the line of sight (when this movement is possible).

This type of automatic control is sufficient when knowledge of the angular position of the line of sight is sufficiently precise relative to the movement of the carrier (absolute position of the line of sight having a low drift with respect to the movement of the carrier) and sufficiently precise information is available on the environment to allow a projection of the image onto the ground to be calculated, on the basis of a terrain model provided by the navigation system for example. These conditions are met in many applications, for example in a ground vehicle having a GPS and a MEMS IMU and equipped with a video camera of average field (typically 40°) that rapidly scans the nearby scene; but this is not the case for a carrier moving very rapidly and having a camera of very small field that scans a scene at very great distance, and having an inertial sensor the measurement errors or angular drift of which are much higher than the resolution of one pixel of the video camera.

In the case where the precision of the information, obtained from the inertial means, on the angular position of the line of sight and/or on the terrain is insufficient to allow a projection of the images onto the ground that is precise enough to allow the required alignments and overlaps to be obtained, an automatic control of a second type, based on image processing, is preferably employed:

Association of images with known image-processing techniques (correlation of pixels of sub-images, matching of primitives), and calculation of geometric transformations existing between these images on the basis of the preceding associations, in order to directly measure the overlap and alignment of these images once projected onto the ground. This associating operation is applied to adjacent images obtained in a first scan of a band of terrain, but also to overlapping images obtained in successive scans of the same zone of terrain.

Measurement of geometric transformations and correlations between projected images and images of the initial strip in order to precisely measure the position of the projected images in the coordinate system of the initial strips, and calculation, on the basis of these measurements, of the angular position of the movements of the line of sight (relatively and absolutely if a precise angular reference is available for the first strip).

Use of the measured angular position of the line of sight to apply suitable angular corrections, optionally with a time-domain matched filter. These angular corrections take into account the measured angular position of the line of sight and the angular position that the latter should have i.e. would have if the "low" overlap criterion were applied to adjacent images and the "high" overlap criterion, i.e. the criteria that must be met by overlapping images obtained in successive scans of the same subjacent zone of terrain at different times, were applied.

As a result, the line of sight can be very accurately positioned on the ground. This would not have been possible without the image processing, and is achieved despite the fact that the system is not equipped with a sufficiently precise means for directly measuring the angular position of the line of sight. Specifically, when the inertial means are not good enough and the context of the application does not allow the automatic-control technique presented above to be applied to satisfactory effect, the image processing makes it possible to guarantee, with sufficient precision, that a minimum percentage of points of each chosen band of terrain will be revisited by a plurality of successive scans from different lines of sight and viewpoint angles and that the successive images of each strip will be correctly stitched and aligned. It will be recalled that: line of sight is the direction joining the image sensor of the carrier to a point of the terrain targeted thereby and that viewpoint angles are the angles of this line of sight in the Earth's coordinate system, in other words the absolute angles of the line of sight. By definition, these angles are also the angles at which a point on the ground is seen by the sensor (and, vice versa, the angles at which a point on the ground "sees" the sensor).

2) Once the band of terrain 4 has been scanned by this combined forward scan, or the bands of terrain 4a, 4b, 4c have been scanned in parallel, the line of sight is made to scan directly backward as indicated by the downward pointing dashed arrow in FIG. 2b, or by the arrow 8 in FIG. 1a, so as to return the line of sight to (or almost to) the chosen initial position in the scene, though seen from a different point of view because of the advance of the carrier. This backward scan or counter-scan may be direct, i.e. carried out in a single step (or jump): it is then more rapid than the forward scan. This counter-scan may also not be direct. Specifically, during the backward scan, it is optionally possible to carry out step-and-stare operations such as described above, depending on the speed and the time allocated thereto. The position on the ground of the LOS, i.e. the position reached at the end of this backward scan (=return position), need not coincide exactly with the initial position of the LOS on the ground, i.e. the position initially obtained in the first strip: an offset, set beforehand by the system and typically of 20% of the size of the first image, is acceptable, above all in the case of a scrolling band as will be seen below. This return position is determined by the processing unit via processing of previously acquired images. The calculated return position, which is as close as possible to the position of the initial line of sight in the first strip, takes into account dead-lock constraints and the maximum system-permitted distance that the line of sight can travel. A drift of the carrier off its course may occasion automatic-control corrections by the system in order to return the line of sight to the calculated point. Image processing, if the latter is applied, also allows the angular offset between the line of sight of the current image and the line of sight of the initial image to be precisely measured with a view to suitably correcting the automatic control.

The above description is based on a forward scan, i.e. a scan in the direction of the path of the carrier, and a counter-scan in the opposite direction. More generally, an outward scan and a return counter-scan need not necessarily bear any relation to the path of the carrier and their direction may be chosen such as to minimize constraints on the distance traveled by the line of sight and to optimize the number of outward-return trips made by the line of sight. It is thus possible to tailor the choice of the scanning direction to bands that are closed on themselves or highly inclined with respect to the path. The outward scan may also be a scan in the direction opposite to the path (=a backward scan), the counter-scan then being a forward scan.

The frontways and sideways step-and-stare movements that the line of sight is required to make allow the desired number of bands to be scanned, and set the desired orientation and shape of each band and the number of times that they are scanned.

According to one particular case illustrated in FIG. 1b, the ground scene consists of one or more bands 4 that may be open or closed in order, for example, to form a circle shape or a rectangle shape. A plurality of concentric shapes may be simultaneously formed around an initial shape—return to the idea of separate bands. A closed band may be scanned with a single periodically repeated outward scan of the entire length of the closed bands (in the case where the latter encircle the carrier as is the case in FIG. 1b, the line of sight is periodically scanned all the way around the carrier so as to successively scan the various bands, as more particularly illustrated in FIG. 1c) or with repeated outward-return scans between 2 points of the band, depending on the chosen automatic-control mode. The bands may also cross or touch in places.

The method proposes 2 outward-return scanning modes depending on whether or not it is desired to maximize the number of viewpoints of the ground.

Figure 3:
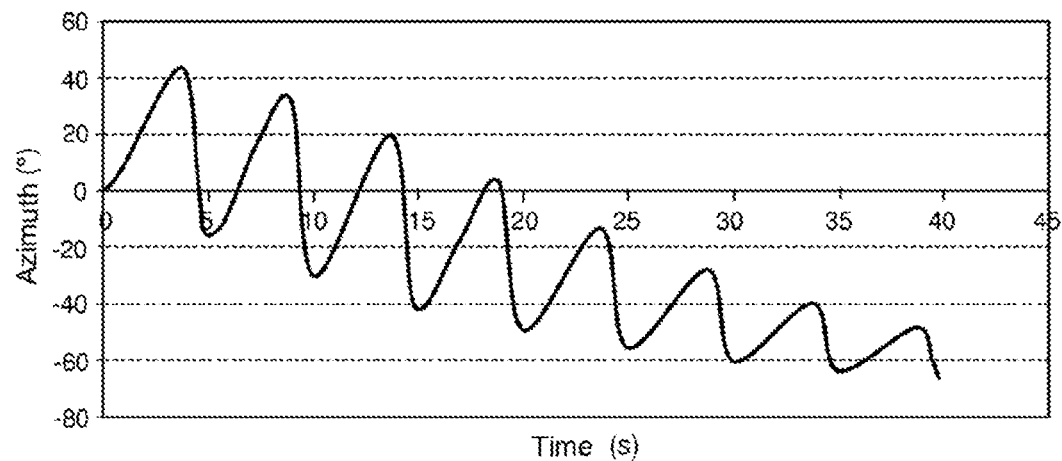
FIG. 3 schematically illustrates an example of movement of the line of sight of a sensor according to the method of the invention, the elevation and azimuth being expressed in degrees.
Figure 3:
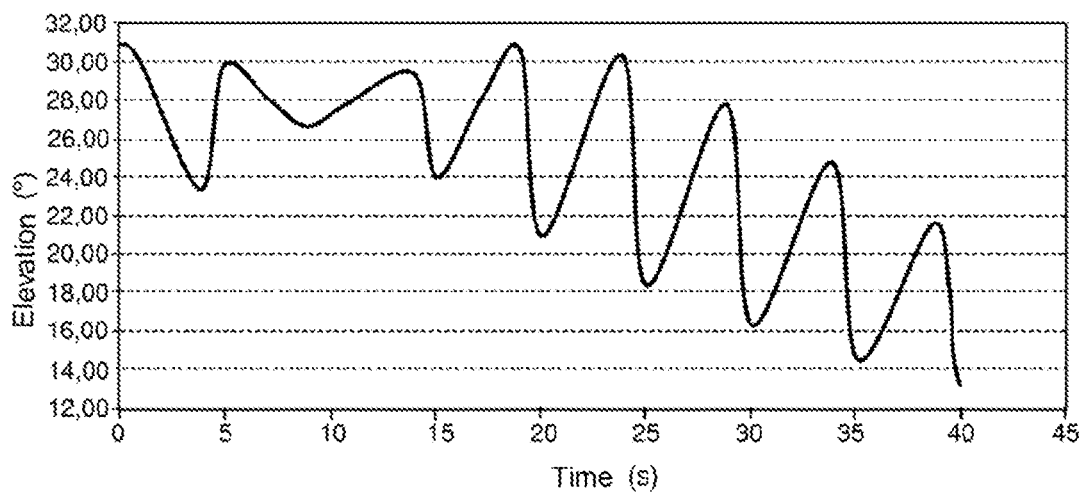

A first mode in which the scan and counter-scan are repeated is suitable for maximizing the number of viewpoints of the ground for a given band size. FIG. 3 illustrates the movements of the line of sight in the case of elevation-ways/azimuth-ways outward and return scans carried out, for a ground scene of 10 km length and 500 m width, using a pod that is mounted on an airplane and that scans this scene from a height of 6 km, the sideways distance between the band and plumb with the pod being 8 km and the maximum angular distance of travel being +/−45°. In the described example, the various points on the ground may be seen up to 16 times, from different viewpoints and at different times.

In a second embodiment, the ground scene forms one or more bands that move as the carrier advances. It is for example a question of scrolling bands that scroll as the carrier advances, and that are not therefore limited in the length direction. The strips of images that are generated are continuously renewed from various angular viewpoints throughout the duration of the movement of the carrier, without discontinuity. The length of the band therefore corresponds, more or less, to the distance traveled by the carrier (several tens or hundreds of kilometers in the case of an aircraft).

In the case of the second embodiment, when it is desired to view a plurality of bands from different viewpoints continuously, it has been shown that it is enough to keep the distance of travel in the outward and return scanning patterns constant, and that, via suitable synchronization thereof, it is possible to produce strips corresponding to bands that are offset on the ground (in the direction of the path of the carrier) and the points of which are re-seen successively over time from various angular viewpoints. The number of times that all the points of the band are seen depends directly on the maximum scanning speed of the beam over the ground, but will always be less than the first scanning and counter-scanning mode described above. In our example, 5 different angular views of each point of the overflown terrain will be acquired, continuously.

Prior to the implementation of this automatic control of the LOS according to the invention, automatic-control parameters are optimized depending:

on the average distance and the spatial extent of the scene to be scanned;

on constraints on the shape of the bands associated with this scene;

on the desired average degree of overlap of the images of a plurality of strips of a given terrain-band segment to be scanned, and on the average degree of overlap of two adjacent images of a given strip;

on the maximum speed and on the maximum acceleration of the scan;

on the inclination, on the field of view, and on the resolution of the sensor; and on the integration time required to correctly image the scene;

in order to determine:

the size of the images of the ground that are scanned by the sensor at a time t;

the minimum movement (in the frontways and sideways steps) that must be employed by the scan to make the various images partially overlap, in order to produce a continuous strip of images. This movement is calculated, at each time, by taking into account the arrangement, on the ground, of 2 current adjacent images, but it may also be adjusted after a first complete angular scan;

the instantaneous scanning speed or the average scanning speed required to achieve the preceding condition and to obtain the required integration time, and the time required to produce the associated step-and-stare micro-scanned pattern;

the maximum possible angular distance of travel (=maximum angle that the LOS travels) that guarantees that the constraints on the scan speed and maximum acceleration of the sensor will not be exceeded;

the maximum number of outward-return scans required to cover the ground scene and the maximum possible sideways distance of travel;

the maximum average degree of overlap that can actually be achieved for the overlap of successive strips and the required minimum average degree of overlap between adjacent images of a given strip.

The outward scans are made at a speed that takes into account, as indicated above, the various constraints on the system: the path of the carrier, size on the ground of the images, required integration time, maximum acceleration and speed of the automatic controls along various axes (for example elevation/azimuth, which are not necessarily the same constraints).

Direct counter-scans (complete scan in the opposite direction to the preceding scan) are carried out at maximum speed, without taking into account integration times or imaging-related system data (unless the system allows it), and are solely limited by the maximum speeds and maximum accelerations of the automatic controls.

The outward and return scans must be tailored angularly in order to ensure a scan and counter-scan of the same segment of ground.

The aim of this automatic control is to allow strips of contiguous or overlapping images to be created, which strips are regenerated at regular time intervals, from different angular viewpoints. This allows:

the operator to see the various elements of the scene from different viewpoints. This in particular allows objects that could be hidden by elements of the scene to be unmasked, but also the various facets of an object of the scene to be seen and thus said object to be better recognized;

3-D structures of the scene to be reconstructed with suitable and known software packages and algorithms, and this reconstruction to be overlaid with the various images of strips overlapping these structures; and software packages and algorithms to reconstruct a conformal ortho-photograph of various portions of the scene and in various planes. This type of reconstruction is not possible, or if so not very readily, with other scanning techniques.

The method may be generalized to the automatic control of other types of sensors (radar, LIDAR, etc.).

The method is applicable to an aircraft, as in the described examples, but is also entirely applicable to any other type of moving carrier (ground vehicle, boat, short- or long-range drone, etc.).

On the basis of the images acquired using this method, it is possible to envision, by way of industrial applications:

specific LIDAR or SAR applications requiring passes at different inclinations;

the generation of very high resolution conformal tiled maps of large extent, including at very great distance using a high-resolution optic of small field;

the generation of such maps at different times with different presentation angles, this facilitating detection of weakly contrasted or partially masked objects;

the ability to carry out 3-D reconstruction over a large spatial extent, with a high resolution and at a large distance;

etc.

The present invention may be implemented using hardware and/or software elements. The line of sight may in particular be automatically controlled by a computer program product, this computer program comprising code instructions allowing the steps of the automatic-control method to be carried out. It is recorded on a computer-readable medium. The medium may be electronic, magnetic, optical, electromagnetic or be an infrared broadcast medium. Such media are for example, semiconductor memories (random access memory (RAM), read-only memory (ROM)), tapes, floppy disks or magnetic or optical disks (compact disc read-only memory (CD-ROM), compact disk-read/write (CD-R/W) and DVD).

The invention claimed is:

1. A method for acquiring images of a preset ground scene, from a carrier moving along a path, and that is equipped with an optical sensor having a line of sight, which comprises the optical sensor acquiring successive images of the scene during the movement of the carrier, and automatically controlling an angular direction of the line of sight by a processing unit that is connected to the optical sensor, the acquisition of the images of the preset ground scene being carried out:

for a first position of the carrier on its path, with automatic control of the angular direction of the line of sight allowing an outward scan combined with a scan in step-and-stare mode of a preset band of terrain of the scene to be carried out, a first strip of images being acquired;

and wherein at least one other strip of images of a same zone of terrain as the first strip is acquired by reiterating the scanning for at least one other position of the carrier on its path, each image of another strip of a terrain-band segment being acquired, for a same terrain-band segment, with an amount of overlap with one or more images of the first strip that is larger than a preset degree of overlap, the overlapping images of the same terrain-band segment of one strip to the next being acquired in the iterations in various directions of the line of sight, respectively;

wherein the step-and-stare mode, which includes translational micro-movements that have an amplitude controlled by the processing unit, comprises:
- a main component that is perpendicular to the outward scan,
- a main component that is parallel to the outward scan, and
- a biaxial stare micro-movement in order to compensate for a translational movement of the line of sight during the acquisition of each image, and wherein the automatic control of the angular direction of the line of sight is achieved by carrying out image processing on the acquired images.

2. The image-acquiring method as claimed in claim 1, wherein the first position and successive positions of the carrier serving as base for the reiterated scanning are multiple and decomposed into as many positions as there are images during the scan when the carrier is moving during the scan.

3. The image-acquiring method as claimed in claim 1, wherein the acquisition of the successive images is carried out for K different positions of the carrier, K being comprised between 5 and 20.

4. The image-acquiring method as claimed in claim 1, wherein the automatic control of the angular direction of the line of sight is achieved by carrying out image processing on the acquired images so that, within a given strip, adjacent images are aligned with an alignment quality that exceeds a predefined threshold.

5. The image-acquiring method as claimed in claim 1, wherein the automatic control of the angular direction of the line of sight is achieved by carrying out image processing on the acquired images so that, within a given strip, adjacent images overlap by an amount that is larger than a preset degree of overlap to obtain a continuous strip.

6. The image-acquiring method as claimed in claim 1, wherein the automatic control of the angular direction of the line of sight is achieved by carrying out image processing on the acquired images so that the images of a given scene segment originating from two strips are aligned with an alignment quality that exceeds a predefined threshold.

7. The image-acquiring method as claimed in claim 1, wherein the biaxial stare micro-movement is furthermore associated with a counter-rotary movement of the line of sight, which movement is determined by the processing unit in order to compensate for a rotational movement of the line of sight during the image acquisition.

8. The image-acquiring method as claimed in claim 1, wherein at least one other preset band of terrain is associated with the scene and is scanned, and wherein the step-and-stare mode further comprises at least one terrain-band-changing lateral movement in order to pass from one terrain band to another terrain band.

9. The image-acquiring method as claimed in claim 8, wherein the terrain-band-changing lateral movement is combined with a band-changing frontways movement.

10. The image-acquiring method as claimed in claim 1, wherein the outward scan is carried out in a direction of the path.

11. The image-acquiring method as claimed in claim 1, wherein a counter-scan, which is an inverse of the outward scan, is carried out following a first iteration of the outward scan and before the reiterations of the scanning.

12. The image-acquiring method as claimed in claim 11, wherein the counter-scan is a direct counter-scan.

13. The image-acquiring method as claimed in claim 11, wherein images are acquired during the counter-scan, which is combined with a scan in step-and-stare mode with translational micro-movements that have an amplitude that is controlled by the processing unit so that the successively acquired images partially overlap, wherein the scan in the step-and-stare mode comprises:
- scanning the zone sideways,
- scanning the zone longitudinally, and
- compensating for a translational movement of the line of sight during an acquisition of each of the images acquired during the counter-scan.

14. The image-acquiring method as claimed in claim 1, wherein at least one band of terrain scrolls with an advance of the carrier.

15. The image-acquiring method as claimed in claim 1, wherein at least one band of terrain is closed on itself.

16. The image-acquiring method as claimed in claim 1, wherein at least two bands of terrain that are scanned by the line of sight cross or touch in places.

17. The image-acquiring method as claimed in claim 1, wherein the carrier is an aircraft.

18. A non-transitory computer-readable medium comprising instructions executable by a computer to perform the image-acquiring method as claimed in claim 1.

* * * * *